United States Patent Office 2,978,469
Patented Apr. 4, 1961

2,978,469
ESTERIFICATION PROCESS

John H. Brown, Jr., Freeport, and Nicholas B. Lorette, Lake Jackson, Tex., assignors to The Dow Chemical Company, Midland, Mich., a corporation of Delaware No Drawing. Filed July 10, 1958, Ser. No. 747,567

7 Claims. (Cl. 260—410.9)

The present invention relates to organic esters and is more particularly concerned with a new and useful method for preparing the lower alkyl esters of organic acids.

Present methods for preparing the esters of organic acids generically require the separation of the water of reaction from the desired product. Further, the usual yield, even after prolonged reaction, is ordinarily substantially below 100 percent.

It is, therefore, an object of the present invention to provide a process for the preparation of esters of organic acids which does not require high temperatures or separation of water of reaction. A further object of the present invention is to provide a process for the preparation of organic esters which process improves the yields of the desired product. These and other objects will become apparent to those skilled in the art from the following specification and claims.

It has now been found that the alkyl esters of organic acids can be prepared by reacting the organic acid with a dialkyl ketal in the presence of a catalytic amount of water or alcohol and an acid esterification catalyst. The reaction conveniently can be represented by the following general formula:

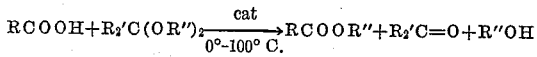

Wherein R is the residue of a carboxylic acid, R' is the alkyl radical of a dialkyl ketone and R'' is the residue of an organic primary or secondary alcohol. As indicated in the above formula, the reaction proceeds smoothly at temperatures of from 0° to 100° C., preferably the reaction is carried out at temperatures of from 20° to 50° C.

The ratio of reactants in accordance with the present invention is at least equimolar proportions of the acid and ketal and preferably about a ten percent excess of ketal based on the acid. The water or alcohol is preferably employed in at least 10 mole percent of said acid but may be more or less as economics demands. The more such compound present the more rapid the rate of reaction. However, the more such compound present the more alcohol must be removed. Thus, the amount of such compound present is an economic factor with 10 mole percent being the lower economical limit under the present process data and equipment available.

Various acids have been employed successfully in accordance with the teaching of the present invention. Some of such acids are, for example, propionic acid, adipic acid, isobutyric acid, dehydrated castor oil acids, oxalic acid, acetic acid, valeric acid, isovaleric acid, heptanoic acid, hexanoic acid, octanoic acid, decanoic acid, oleic acid, eicosanoic acid, and the like and their chlorinated derivatives. Generally any of the organic carboxylic acids that can be esterified by reaction with an alcohol may be used.

Likewise substantially any of the primary or secondary lower alkanols can be employed in accordance with the present invention. Thus, one can employ methanol, ethanol, propanol, butanol, isobutanol, sec.-butanol, pentanol, the secondary pentanols, hexanol, heptanol, octanol and the like. While it is possible to employ the higher alkanols, it is not considered economically feasible to obtain the corresponding ketal and thus, unless mixed esters are desired, the use of the higher alkanols is not a preferred embodiment of the present invention.

The ketals employed in accordance with the present invention are principally the 2,2-dimethoxy- and 2,2-diethoxypropanes. However, it is to be understood that other lower aliphatic ketals can be employed with like success. For example the lower alkanone dimethyl, diethyl, dipropyl, dibutyl, dipentyl, dihexyl, diheptyl, dioctyl ketals, diallyl, diisopropyl, di-sec.-butyl, bis(2-chloroethyl), bis-(2-methoxyethyl), diisoamyl, their isomers and the like, wherein the alkanone contains about 3–8 carbon atoms, may be used.

The esters of higher alcohols conveniently can be prepared from the lower alcohol ester products of the present invention by the well known ester interchange or the process of the present invention by employment of the higher ketals. Thus, for example, when dioleoxypropane or the like is available, the use of the ketal in accordance with the present invention will produce the oleate of an organic acid in the same manner as the dimethoxy ketal hereinbefore described. It is to be understood that the process of the present invention can be operated in a batch-wise or continuous manner and that in either manner the ketal may be added in a single step, in a portionwise manner or in a continuous manner predetermined by rate of the reaction.

The following examples illustrate the present invention but are not to be construed as limiting.

Example I

A. A solution composed of propionic acid (0.25 mole), methanol (0.55 mole), HCl (0.0056 mole) and sufficient dioxane to make the total volume 100 ml. was allowed to react at room temperature (25° C.). The unreacted acid was determined by titrating an aliquot with a standard NaOH-ethanol solution. At equilibrium 89 percent of the acid was converted to the ester.

B. Simultaneously a solution composed of propionic acid (0.25 mole), methanol (0.55 mole), HCl (0.0056 mole), 2,2-dimethoxypropane (0.275 mole) and dioxane to make the total volume 100 ml. was allowed to react at room temperature. Before Example IA reached equilibrium, all of the propionic acid of Example IB was converted to its methyl ester.

Example II

A. A solution composed of propionic acid (0.25 mole), ethanol (0.625 mole), HCl (0.0056 mole) and sufficient dioxane to make the total volume 100 ml. was allowed to react at room temperature until equilibrium was reached. An 85.60 percent conversion of the propionic acid occurred.

B. A solution composed of propionic acid (0.25 mole), ethanol (0.125 mole), HCl (0.0056 mole), 2,2-diethoxypropane (0.275 mole) and dioxane to make the total volume 100 ml. was allowed to react at room temperature. There was complete conversion of the propionic acid to the ethyl ester.

Example III

A. A solution composed of isobutyric acid (0.25 mole), ethanol (0.75 mole), HCl (0.006 mole) and sufficient dioxane to give a total volume of 100 ml. was allowed to react at room temperature. At equilibrium 83.8 percent of the acid was converted to the ethyl ester.

B. A solution composed of isobutyric acid (0.25 mole), ethanol (0.25 mole), HCl (0.006 mole), 2,2-diethoxypropane (0.275 mole) and sufficient dioxane to give 100 ml. was allowed to react at room temperature. Complete conversion of the acid to the ester occurred.

*Example IV*

This experiment shows the effect of the ketal on the reaction rate during an esterification. Two solutions were made up, one with a portion of the alcohol present as a part of the ketal molecule and the other with only the free alcohol. Even though the slight advantage of concentration lies with the control, the data still shows that the rate with the ketal is significantly higher.

| Reagents | Concentrations (Moles) | | |
|---|---|---|---|
| | A | B | C |
| Propionic acid | 0.25 | 0.25 | 0.25 |
| Anhyd. HCl | 0.006 | 0.006 | 0.006 |
| Methanol | 0.75 | 0.25 | 0.074 |
| Acetone dimethyl acetal | | 0.275 | 0.275 |
| Dioxane | (1) | (1) | (1) |

1 To make to 100 ml.

The solutions were maintained at 30° C. and samples withdrawn periodically and titrated to determine the extent of the reactions.

| Hours Elapsed Time | Percent Propionic Acid Converted to Ester | | |
|---|---|---|---|
| | A | B | C |
| 2 | 67 | 60 | 4 |
| 5 | 82 | 98 | 11 |
| 10 | 89 | >99 | 33 |
| 20 | 94 | >99 | >99 |

*Example V*

Four moles (585 g.) of adipic acid was added to a solution of 5 g. of p-toluenesulfonic acid dissolved in 5 moles (200 ml.) of methanol. This mixture was stirred and maintained at 40° to 60° C. As the reaction progressed, 2,2-dimethoxypropane was added incrementally. By the end of half an hour, 200 ml. had been added; by the end of one hour, 600 ml. total had been added (at this point all adipic acid was in solution); and by the end of 1.5 hours, a total of one liter (8 moles) of 2,2-dimethoxypropane had been added. At the end of two hours only 10 percent of the acid remained unreacted. After 4 hours the reaction was >99 percent complete. One half of the crude solution was then distilled at a rate such that by the end of 3 hours all of the acetone and methanol had been removed. This left a 98.8 percent yield of crude, straw colored dimethyl adipate, $n_D^{25}$, 1.4275. This material was distilled to give a recovered yield of 94 percent of dimethyl adipate; $n_D^{25}$, 1.4263; $b_{10}$, 109° C.

A similar experiment in which all of the reactants were mixed at one time and left overnight at room temperature (with stirring) resulted in 100 percent conversion of the adipic acid.

*Example VI*

One mole of oxalic acid dihydrate, 2 g. of p-toluenesulfonic acid and 2 moles of 2,2-dimethoxypropane were combined with stirring. Heat was applied so that a pot temperature of 55–63° C. was maintained. After one hour and 15 minutes another mole of 2,2-dimethoxypropane was added. Reflux was continued and after an elapsed reaction time of two hours and 15 minutes the final mole of 2,2-dimethoxypropane (4 mole total) was added. The reaction was 98 percent complete after five hours, at which time the methanol and acetone were distilled until only 175 ml. of the product-methanol solution remained. By cooling, filtering out the white crystalline product and reworking the mother liquor, 107 g. of dimethyl oxalate (91 percent theory), M.P. 51–53° C., was recovered.

*Example VII*

A mixture of 200 ml. of dehydrated castor oil acids (1 ml.=30.4 ml. N/10 NaOH), 0.60 mole of 2,2-dimethoxyproprane, 0.3 mole of methanol and 0.012 moles HCl was allowed to stand at room temperature. The organic acid concentration was less than 1 percent after 39 hours.

*Example VIII*

Propionic acid (0.25 mole), anhydrous HCl (0.006 mole) and acetone dimethyl acetal (0.275 mole) were mixed together and made up to 100 ml. volume with dioxane and allowed to react.

Two other reaction mixtures were made up, each containing the same amounts of propionic acid and HCl as above but (b) containing 0.05 mole of water and 0.325 mole of the acetal, and (c) containing 0.1 mole of water and 0.375 mole of the acetal, respectively. Each mixture was made up to 100 ml. with dioxane. Each of the mixtures was sampled periodically for analysis. The following table shows the precent propionic acid converted at various times during the course of reaction.

| Hours Elapsed | Percent Propionic Acid Converted To Ester | | |
|---|---|---|---|
| | A[1] | B[1] | C[1] |
| 2 | 1 | 4 | 30 |
| 5 | 1 | 13 | 90 |
| 10 | 1 | 45 | >99 |
| 20 | 2 | 98 | >99 |
| 48 | 4 | >99 | >99 |
| 75 | >99 | >99 | >99 |

[1] Expt. A contained no water. Expt. B contained 0.05 mole water. Expt. C contained 0.10 mole water.

Similar results are obtained when the organic acid in the above examples is replaced with other carboxylic acids, such as benzoic, phthalic, phenoxyacetic, citric, maleic, acrylic, lactic, ascorbic, stearic, 2,3-dichloropropionic, any esterifiable carboxylic acid. Likewise, the ketals may be replaced with other dialkyl or dialkenyl ketals such as the diisopropyl, diisobutyl, diallkyl, di-(chloroethyl), dioctyl or dilauryl ketal of acetone, methyl ethyl ketone, diethyl ketone, 2-butanone, 2-, 3- or 4-heptanone, or the like.

It should be noted that when one or more of the reactants contains water, as water of crystallization, as in Example VI, or otherwise, a correspondingly larger amount of ketal should be used since each mole of water consumes a mole of ketal.

We claim:
1. A process for making esters of organic acids which comprises the step of reacting in approximately equimolar amounts a lower aliphatic ketal of a lower alkanone with an organic carboxylic acid having from two to twenty carbon atoms in the presence of a neutral hydroxyl compound selected from the group consisting of water and lower alkanols in an amount of at least about 10 mole percent of the acid present at a temperature of from about 0° to 100° C., and in the presence of a catalytic amount of an acid esterification catalyst.

2. The process of claim 1 wherein the reaction is carried out at a temperature of between about 20° and about 50° C.

3. A process for producing a lower alkyl ester of an organic acid comprising contacting approximately equimolar amounts of a di-lower alkyl ketal of a lower alkanone and an organic carboxylic acid having from two to twenty carbon atoms in the presence of a neutral hydroxyl compound selected from the group consisting of water and lower alkanols in an amount of at least about 10 mole percent of the acid present and in the presence of a catalytic amount of an acidic esterification catalyst while maintaining said mixture at a temperature of about 0° to 100° C.

4. The process of claim 3 wherein the mixture is maintained at a temperature of between about 20° and about 50° C.

5. A process for making esters of organic acids comprising reacting approximately equimolar amounts of a lower aliphatic ketal of a lower alkanone with an organic carboxylic acid having from two to twenty carbon atoms in the presence of a neutral hydroxyl compound selected from the group consisting of water and the lower alkanols in an amount of at least about 10 mole percent of the acid present at a temperature from about 0° to about 100° C. and in the presence of a catalytic amount of an acid esterification catalyst.

6. The process of claim 5 wherein the reaction is carried out at a temperature of between about 20° and 50° C.

7. A process for making esters of organic acids comprising reacting approximately equimolar amounts of a lower aliphatic ketal of a lower alkanone with an organic carboxylic acid having from two to twenty carbon atoms in the presence of a neutral hydroxyl compound selected from the group consisting of water and lower alkanols in an amount of at least about 10 mole percent of the acid present at a temperature of from about 0° to about 100° C. and under reflux conditions and in the presence of an acid esterification catalyst and removing the alcohol and ketone to obtain the ester in substantially pure and anhydrous form.

References Cited in the file of this patent

UNITED STATES PATENTS

| | | |
|---|---|---|
| 2,423,783 | Lippincott | July 8, 1947 |
| 2,698,341 | Kleene et al. | Dec. 28, 1954 |

FOREIGN PATENTS

| | | |
|---|---|---|
| 464,427 | Great Britain | Apr. 19, 1937 |

OTHER REFERENCES

Baum et al.: "J. Am. Chem. Soc.," vol. 60 (1938), pages 569 and 570.

Hackh's "Chemical Dictionary," 3rd Edition, 1944, page 5.